(12) United States Patent
O'Neill et al.

(10) Patent No.: US 10,777,845 B2
(45) Date of Patent: Sep. 15, 2020

(54) SOLID ELECTROLYTE COMPOSITIONS FOR ELECTROCHEMICAL CELLS

(71) Applicant: Wildcat Discovery Technologies, Inc., San Diego, CA (US)

(72) Inventors: Cory O'Neill, San Diego, CA (US); Bin Li, San Diego, CA (US); Alex Freigang, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 15/820,107

(22) Filed: Nov. 21, 2017

(65) Prior Publication Data

US 2018/0159172 A1 Jun. 7, 2018

Related U.S. Application Data

(60) Provisional application No. 62/425,990, filed on Nov. 23, 2016.

(51) Int. Cl.
*H01M 10/056* (2010.01)
*H01M 10/0525* (2010.01)
(Continued)

(52) U.S. Cl.
CPC ........... *H01M 10/056* (2013.01); *C01B 25/45* (2013.01); *H01M 4/623* (2013.01);
(Continued)

(58) Field of Classification Search
CPC . H01M 2300/0065; H01M 2300/0068; H01M 4/623; H01M 10/056; H01M 10/0525; H01M 2300/0082; H01M 2300/0091; H01M 2220/30; C01B 25/45; C01P 2006/40; C01P 2002/54
(Continued)

(56) References Cited

U.S. PATENT DOCUMENTS 4,009,092 A 2/1977 Taylor
4,722,877 A 2/1988 Sammells
(Continued)

FOREIGN PATENT DOCUMENTS

CN 103985900 A 8/2014
CN 104600358 A 5/2015
(Continued)

OTHER PUBLICATIONS

Abouimrane, A., et al., "Solid Electrolyte Based on Succinonitrile and LiBOB Interface Stability and Application in Lithium Batteries", Journal of the Electrochemical Society, 154 (11) A1031-A1034 (2007).
(Continued)

*Primary Examiner* — Jonathan G Jelsma
*Assistant Examiner* — Omar M Kekia
(74) *Attorney, Agent, or Firm* — The Small Patent Law Group LLC; Philip S. Hof

(57) ABSTRACT

A solid-state electrolyte including an ion-conducting inorganic material represented by the formula $Li_{1+y}Zr_{2-x}Me_x(PO_4)_3$ where $2>x>0$, $0.2>y>-0.2$, and Me is at least one element from Group 14, Group 6, Group 5, or combinations thereof.

18 Claims, 4 Drawing Sheets

(51) Int. Cl.
*C01B 25/45* (2006.01)
*H01M 4/62* (2006.01)

(52) U.S. Cl.
CPC ..... *H01M 10/0525* (2013.01); *C01P 2002/54* (2013.01); *C01P 2006/40* (2013.01); *H01M 2220/30* (2013.01); *H01M 2300/0068* (2013.01); *H01M 2300/0082* (2013.01); *H01M 2300/0091* (2013.01)

(58) Field of Classification Search
USPC .......................................................... 429/316
See application file for complete search history.

(56) References Cited

U.S. PATENT DOCUMENTS

| | | | |
|---|---|---|---|
| 5,300,374 | A | 4/1994 | Agrawal et al. |
| 5,599,355 | A | 2/1997 | Nagasubramanian et al. |
| 6,822,065 | B1 | 11/2004 | Sanchez et al. |
| 2002/0197535 | A1 | 12/2002 | Dudley et al. |
| 2003/0094599 | A1 | 5/2003 | Le et al. |
| 2004/0029014 | A1 | 2/2004 | Hwang et al. |
| 2004/0106046 | A1 | 6/2004 | Inda |
| 2005/0132562 | A1 | 6/2005 | Saito et al. |
| 2006/0035148 | A1 | 2/2006 | Balaya et al. |
| 2007/0020527 | A1 | 1/2007 | Ehrismann et al. |
| 2008/0124630 | A1 | 5/2008 | Kim et al. |
| 2008/0248396 | A1 | 10/2008 | Jung et al. |
| 2008/0292963 | A1 | 11/2008 | Sato et al. |
| 2008/0318133 | A1 | 12/2008 | Matsuyama et al. |
| 2009/0104538 | A1 | 4/2009 | Wakihara et al. |
| 2009/0136830 | A1 | 5/2009 | Gordon |
| 2009/0191462 | A1 | 7/2009 | Matsui et al. |
| 2011/0177398 | A1 | 7/2011 | Affinito et al. |
| 2011/0300432 | A1 | 12/2011 | Snyder et al. |
| 2012/0094186 | A1 | 4/2012 | Chu et al. |
| 2012/0288770 | A1 | 11/2012 | Yokoyama |
| 2013/0026409 | A1 | 1/2013 | Baker et al. |
| 2013/0260207 | A1 | 10/2013 | Uemura |
| 2013/0273437 | A1* | 10/2013 | Yoshioka ............ H01M 2/1673 429/322 |
| 2013/0309570 | A1 | 11/2013 | Kim et al. |
| 2014/0134483 | A1* | 5/2014 | Ouchi ............... H01M 10/0562 429/209 |
| 2014/0170504 | A1* | 6/2014 | Baek .................. H01M 10/056 429/317 |
| 2014/0308570 | A1 | 10/2014 | Gaben et al. |
| 2014/0308576 | A1 | 10/2014 | Gaben et al. |
| 2014/0370398 | A1* | 12/2014 | Lee .................... H01M 4/5815 429/322 |
| 2015/0171463 | A1 | 6/2015 | Liang et al. |
| 2015/0188187 | A1 | 7/2015 | Strand et al. |
| 2017/0047581 | A1 | 2/2017 | Lu et al. |
| 2017/0077547 | A1* | 3/2017 | Takami ............... H01M 10/056 |
| 2017/0309914 | A1 | 10/2017 | Drews et al. |

FOREIGN PATENT DOCUMENTS

| | | |
|---|---|---|
| JP | 2011108499 A | 6/2011 |
| JP | 2015079702 A | 4/2015 |
| WO | 1997049106 A1 | 12/1997 |

OTHER PUBLICATIONS

Arbi, K., et al. "Li mobility in triclinic and rhombohedral phases of the Nasicon-type compound LiZr2(PO4)3 as deduced from NMR spectroscopy", Journal of Materials Chemistry, 2002, 12, 2985-2990.

Croce, F., et al., "Nanocomposite, PEO-LiBOB Polymer Electrolytes for Low Temperature, Lithium Rechargeable Batteries", Journal of New Materials for Electrochemical Systems 9, 3-9 (2006).

Egashira, Minato, et al., "Effects of the Surface Treatment of the Al2O3 Filler on the Lithium Electrode/Solid Polymer Electrolyte Interface Properties", Electrochimica Acta 52 (2006) 1082-1086.

Ghosh, Ayan, et al., "Block Copolymer Solid Battery Electrolyte with High Li-Ion Transference Number", Journal of the Electrochemical Society, 157 (7) A846-A849 (2010).

Inada, Ryoji, et al., "Synthesis and properties of Al-free Li7—xLa3Zr2—xTaxO12 garnet related oxides", Solid State Ionics, 262 (2014) 568-5723.

International Search Report & Written Opinion dated Dec. 7, 2017 in International application No. PCT/US2017/040391.

International Search Report & Written Opinion dated Oct. 11, 2017 in International application No. PCT/US2017/040374.

International Search Report & Written Opinion dated Mar. 5, 2018 in International application No. PCT/US2017/062845.

Sumathipala, H. H., et al., "High Performance PEO-based Polymer Electrolytes and their Application in Rechargeable Lithium Polymer Batteries", Ionics (2007) 13:281-286.

Teran, Alexander A., et al., "Effect of Molecular Weight on Conductivity of Polymer Electrolytes", Solid State Ionics 203 (2011) 18-21.

Wang, Congxiao, et al., "All Solid-State Li/LixMnO2 Polymer Battery Using Ceramic Modified Polymer Electrolytes", Journal of the Electrochemical Society, 149 (8) A967-A972 (2002).

Winand, Jean-Marc et al., "Nouvelles Solutions Solides LI (MIV) 2-x (NIV)x(PO 4)3 (L=Li, Na M, N=Ge, Sn, Ti, Zr, Hf) Synthese et Etude par Diffraction x et Conductivite Ionique", Journal of Solid State Chemistry, 93, 1991, pp. 341-349.

Zhang, Ding, et al., "Electrochemical Stability of Lithium bis(oxatlato) borate Containing Solid Polymer Electrolyte for Lithium Ion Batteries", Journal of Power Sources 196 (2011) 10120-10125.

\* cited by examiner

SOLID ELECTROLYTE COMPOSITIONS FOR ELECTROCHEMICAL CELLS

CROSS-REFERENCE TO RELATED APPLICATIONS

This application claims priority to U.S. Provisional Application No. 62/425,990 filed Nov. 23, 2016 entitled "Solid Electrolyte Compositions For Electrochemical Cells." This application claims priority to and the benefit of this application, and such application is incorporated herein by reference in its entirety.

BACKGROUND OF THE INVENTION

The present invention is in the field of battery technology and, more particularly, in the area of solid electrolyte compositions for electrochemical cells.

Conventional lithium ion batteries include a positive electrode (or cathode as used herein), a negative electrode (or anode as used herein), an electrolyte, and, frequently, a separator. The electrolyte typically includes a liquid component that facilitates lithium ion transport and, in particular, enables ion penetration into the electrode materials.

In contrast, so-called solid-state lithium ion batteries do not include liquid in their principal battery components. Solid-state batteries can have certain advantages over liquid electrolyte batteries, such as improvements in safety because liquid electrolytes often contain volatile organic solvents. Solid-state batteries offer a wider range of packaging configurations because a liquid-tight seal is not necessary as it is with liquid electrolytes.

Generally, batteries having a solid-state electrolyte can have various advantages over batteries that contain liquid electrolyte. For small cells, such as those used in medical devices, the primary advantage is overall volumetric energy density. For example, small electrochemical cells often use specific packaging to contain the liquid electrolyte. For a typical packaging thickness of 0.5 mm, only about 60% of the volume can be used for the battery with the remainder being the volume of the packaging. As the cell dimensions get smaller, the problem becomes worse.

Elimination of the liquid electrolyte facilitates alternative, smaller packaging solutions for the battery. Thus, a substantial increase in the interior/exterior volume can be achieved, resulting in a larger total amount of stored energy in the same amount of space. Therefore, an all solid-state battery is desirable for medical applications requiring small batteries. The value is even greater for implantable, primary battery applications as the total energy stored often defines the device lifetime in the body.

Further, solid-state batteries can use lithium metal as the anode, thereby dramatically increasing the energy density of the battery as compared to the carbon-based anodes typically used in liquid electrolyte lithium ion batteries. With repeated cycling, lithium metal can form dendrites, which can penetrate a conventional porous separator and result in electrical shorting and runaway thermal reactions. This risk is mitigated through the use of a solid nonporous electrolyte for preventing penetration of lithium dendrites and enabling the safe use of lithium metal anodes, which directly translates to large gains in energy density, irrespective of cathode chemistry.

There has been considerable work done in the industry on solid-state electrolyte technologies and the state of the art materials typically fall into one of two categories: polymer solid-state electrolytes and inorganic solid-state electrolytes.

Regarding polymer solid-state electrolytes, they have certain advantages, such as being easily processable by standard solution casting techniques and having a flexible nature that allows the polymer to conform to electrode surfaces. Conformal coatings in turn can allow for good mechanical compliance and little loss of contact during battery cycling. On the other hand, polymer solid-state electrolytes have certain drawbacks, including relatively low conductivity (in a range of about $10^{-6}$ to about $10^{-5}$ S/cm) and relatively poor stability at when operated at high voltage (for example, polyethylene oxide polymers are commonly used and have poor high voltage stability). Also, relatively soft polymer films do not prevent the lithium dendrite penetration described above.

Regarding inorganic solid-state electrolytes, they have certain advantages such as relatively high conductivity (in a range of about $10^{-4}$ to about $10^{-3}$ S/cm for the state-of-the-art materials) and comparative hardness that can prevent lithium dendrite penetration. However, this hard and brittle nature of inorganic solid-state electrolyte materials makes them difficult to produce on an industrial scale, especially thin inorganic electrolyte films. The brittleness can lead to loss of contact with the electrode during battery cycling.

Within the class of inorganic solid-state electrolytes, a family of phosphates referred to as NASICON is an attractive candidate for use in batteries. NASICON is an acronym for sodium (Na) Super Ionic CONductor and usually refers to solid materials represented by the chemical formula $Na_{1+x}Zr_2Si_xP_{3-x}O_{12}$, where $0<x<3$. A state-of-the-art example of a lithium version of this material is any of several compositions similar to $Li_{1.3}Ti_{1.7}Al_{0.3}(PO_4)_3$ (LTAP). This material has demonstrated good conductivity (on the order of about $10^{-4}$ S/cm). However, the titanium is electrochemically active at about 2.5V versus lithium and will spontaneously be chemically reduced when put in direct contact with a lithiated anode. The chemical reduction of the titanium in the LTAP can lead to lithium loss in the full cell and subsequent degradation of battery performance.

To account for the chemical reduction of titanium, titanium has been replaced with comparatively inactive zirconium (that is, zirconium is less susceptible to chemical reduction) in materials such as $LiZr_2(PO_4)_3$ (LZP). However, LZP undergoes a low temperature phase transition from its conductive rhombohedral crystalline phase to a low conductivity triclinic crystalline phase at temperature in the range of from about 30 degrees Celsius to about 40 degrees Celsius (see, Arbi et al., *Li mobility in triclinic and rhombohedral phases of the Nasicon-type compound $LiZr_2(PO_4)_3$ as deduced from NMR spectroscopy*, J. Mater. Chem., 2002, 12, 2985-2990). This temperature-induced crystalline phase transition significantly limits the practical use of LZP materials in a battery.

There has been some research into doping of LZP and other lithium materials, such as Barré, M., Le Berre, F., Crosnier-Lopez, M P. et al., *The NASICON solid solution Li1-xLax/3Zr2(PO4)3: optimization of the sintering process and ionic conductivity measurements* Ionics, (2009) 15: 681; Hui Xie, John B. Goodenough, Yutao Li, $Li_{1.2}Zr_{1.9}Ca_{0.1}(PO_4)_3$, *a room-temperature Li-ion solid electrolyte*, Journal of Power Sources, Volume 196, Issue 18, 15 Sep. 2011, Pages 7760-7762; Yutao Li, Meijing Liu, Kai Liu, Chang-An Wang, *High Li+ conduction in NASICON-type $Li_{1+x}Y_xZr_2-x(PO_4)_3$ at room temperature*, Journal of Power Sources, Volume 240, 15 Oct. 2013, Pages 50-53; Mustaffa, N. A. & Mohamed, N. S., *Zirconium-substituted $LiSn_2P_3O_{12}$ solid electrolytes prepared via sol-gel method*, J Sol-Gel Sci Technol (2016) 77: 585; and Russian Journal Of Inorganic Chemistry, Volume: 50 Issue: 6 Pages: 906-911. However, none of the prior art formulations address the significant limitations of current solid-state electrolytes and provides the performance improvements seen in the embodiments disclosed below.

BRIEF SUMMARY OF THE INVENTION

Embodiments of the invention include a solid-state electrolyte including an ion-conducting inorganic material represented by the formula:

$$Li_{1+y}Zr_{2-x}Me_x(PO_4)_3$$

where 2>x>0, 0.2>y>−0.2, and Me is at least one element from Group 14, Group 6, Group 5, or combinations thereof. In some embodiments, Me is tin (Sn), lead (Pb), or combinations thereof. In some embodiments, Me is molybdenum (Mo), tungsten (W), or combinations thereof. In some embodiments, Me is niobium (Nb), tantalum (Ta), or combinations thereof. The solid-state electrolyte can include a polymer binder, such as PVdF. The solid-state electrolyte can include a lithium salt, such as lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), lithium triflate ($LiCF_3SO_3$), lithium bis(fluorosulfonyl)imide (LiFSi), and combinations thereof.

Embodiments of the present invention include a lithium ion battery having an anode, a cathode comprising an electrode active material, and a solid-state electrolyte.

Embodiments of the invention include methods of making a solid-state electrode and a battery containing a solid-state electrode, as well as methods of conditioning and using such a battery.

DETAILED DESCRIPTION OF THE INVENTION

Figure 1:
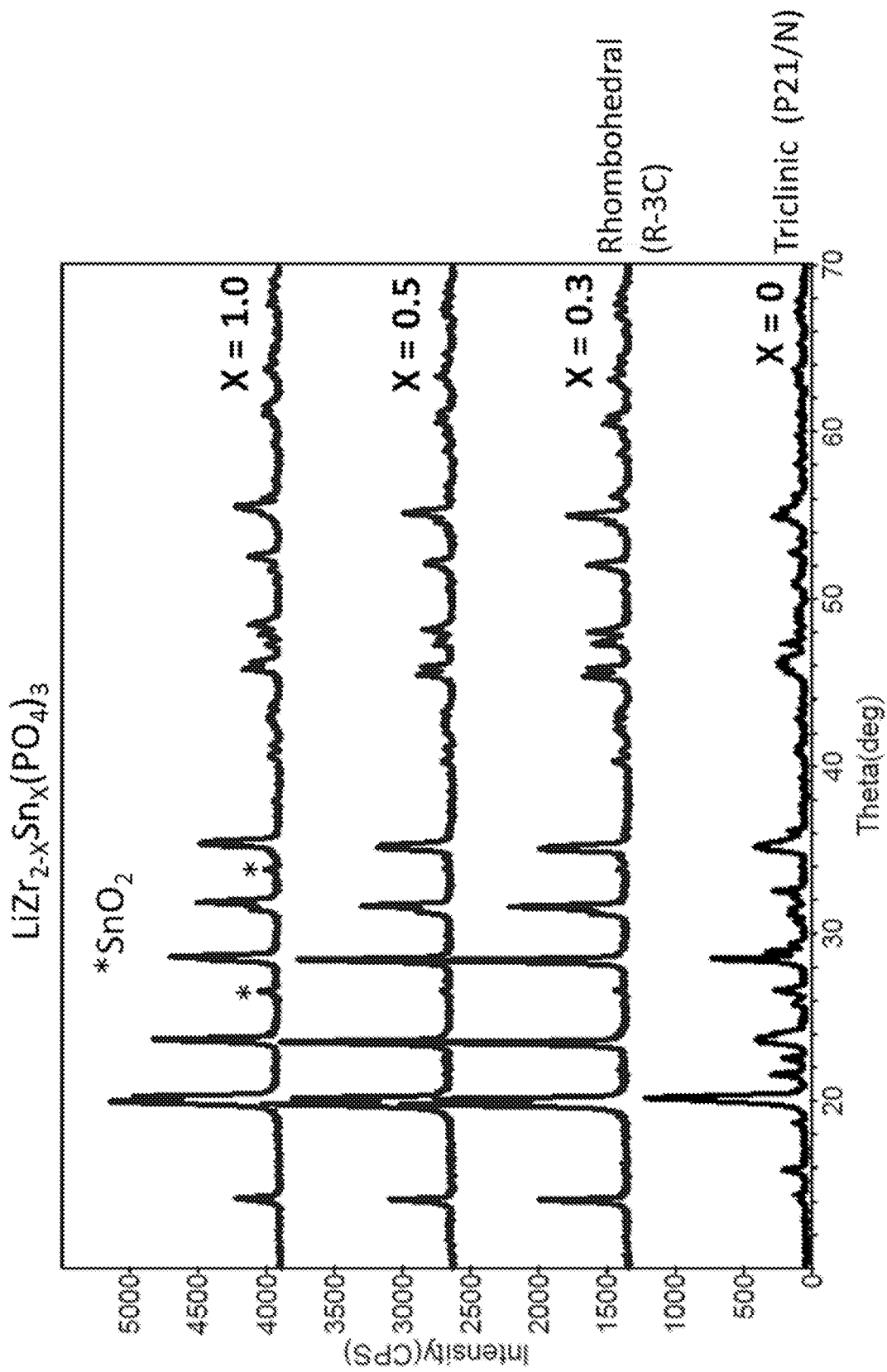
FIG. 1 illustrates x-ray diffraction patterns identifying the nature of the crystalline phases in undoped LZP materials and LZP materials doped with various quantities of tin (Sn) as a dopant according to certain embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely, as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A "C-rate" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "solid-state electrolyte" as used herein is used primarily to distinguish from electrolyte formulations where the formulation is an entirely liquid phase, almost entirely liquid phase, or substantially liquid phase.

Ranges presented herein are inclusive of their endpoints. Thus, for example, the range 1 to 3 includes the values 1 and 3, as well as intermediate values.

In certain embodiments of the invention, doped NASICON-type materials are used to form a solid-state electrolyte. In particular, a material comprising $LiZr_2(PO_4)_3$ (LZP) is doped with certain dopants. The dopants improve the stability of the preferred crystalline phase of the LZP material. In this way, the dopants improve the electrochemical performance of solid-state electrolytes formed from the doped LZP material. Specifically, the rhombohedral crystalline phase of LZP has higher conductive than the triclinic crystalline phase. The dopants disclosed herein maintain the rhombohedral crystalline phase of LZP under conditions in which the rhombohedral crystalline phase would ordinarily transform to the triclinic phases, such as room temperature. When used in a solid state battery, the solid-state electrolytes as disclosed herein provide good lithium conductivity and improved performance as compared to prior art LZP materials.

In the embodiments disclosed herein, certain preferred dopants are identified. In some embodiments, the dopants include Group 14 elements, and in particular the dopants are tin (Sn), lead (Pb), or combinations thereof. In some embodiments, the dopants include Group 6 elements, and in particular the dopants are molybdenum (Mo), tungsten (W), or combinations thereof. In some embodiments, the dopants include Group 5 elements, and in particular the dopants are niobium (Nb), tantalum (Ta), or combinations thereof.

The doped LZP material can be represented by the formula:

$$Li_{1+y}Zr_{2-x}Me_x(PO_4)_3$$

where 2>x>0, 0.2>y>−0.2, and Me is any of the dopants disclosed herein. Me can be a Group 14 element, a Group 6 element, a Group 5 element, or combinations thereof. Preferably, Me is tin (Sn), lead (Pb), molybdenum (Mo), tungsten (W), niobium (Nb), tantalum (Ta), or combinations thereof. The variable "y" varies with both x and the choice of element for Me in such a way to compensate for the charge on the compound. In other instances, y could vary simply because there is a variation in the amount of lithium in the compound.

Representative examples of doped materials according to certain embodiments of the invention include:

$$Li_{1+y}Zr_{1.9}Me_{0.05}(PO_4)_3$$

$$Li_{1+y}Zr_{1.9}Me_{0.1}(PO_4)_3$$

$$Li_{1+y}Zr_{1.9}Me_{0.15}(PO_4)_3$$

$$Li_{1+y}Zr_{1.8}Me_{0.2}(PO_4)_3$$

$$Li_{1+y}Zr_{1.9}Me_{0.25}(PO_4)_3$$

$$Li_{1+y}Zr_{1.7}Me_{0.3}(PO_4)_3$$

$$Li_{1+y}Zr_{1.9}Me_{0.35}(PO_4)_3$$

$$Li_{1+y}Zr_{1.6}Me_{0.4}(PO_4)_3$$

$$Li_{1+y}Zr_{1.9}Me_{0.45}(PO_4)_3$$

$$Li_{1+y}Zr_{1.5}Me_{0.5}(PO_4)_3$$

$$Li_{1+y}Zr_{1.9}Me_{0.55}(PO_4)_3$$

$$Li_{1+y}Zr_{1.4}Me_{0.6}(PO_4)_3$$

$$Li_{1+y}Zr_{1.9}Me_{0.65}(PO_4)_3$$

$$Li_{1+y}Zr_{1.3}Me_{0.7}(PO_4)_3$$

$$Li_{1+y}Zr_{1.9}Me_{0.75}(PO_4)_3$$

$$Li_{1+y}Zr_{1.2}Me_{0.8}(PO_4)_3$$

$$Li_{1+y}Zr_{1.9}Me_{0.85}(PO_4)_3$$

$$Li_{1+y}Zr_{1.1}Me_{0.9}(PO_4)_3$$

$$Li_{1+y}Zr_{1.9}Me_{0.95}(PO_4)_3$$

$$Li_{1+y}Zr_{1.0}Me_{1.0}(PO_4)_3$$

where Me is one or more of Sn, Pb, Mo, W, Nb, Ta. The above examples are merely illustrative. The dopants can be included at any stoichiometric level where $2>x>0$ and the value of x is not limited to intervals of 0.05. This disclosure includes all possible stoichiometric values of x where $2>x>0$.

The solid-state electrolytes formed from the doped LZP material can be formed by any method for fabricating inorganic solid-state electrolytes. For example, the solid-state electrolyte can be formed by melting the LZP at high temperature followed by quenching to form a uniform film or by sintering a pellet of LZP at high temperature and/or pressure. The solid-state electrolyte can also be formed by compositing with a polymer and lithium salt and then forming a film using solution processing methods.

The lithium salts used to create the inorganic solid-state electrolytes disclosed herein include, but are not limited to, lithium bis(trifluoromethanesulfonyl)imide ($CF_3SO_2NLiSO_2CF_3$) (also referred to herein as "LiTFSI"), lithium tetrafluoroborate ($LiBF_4$), lithium hexafluoroarsenate ($LiAsF_6$), lithium bis(oxalato)borate ($LiB(C_2O_4)_2$) (also referred to herein as "LiBOB"), lithium chlorate ($LiClO_4$), lithium hexafluorophosphate ($LiPF_6$), lithium triflate ($LiCF_3SO_3$), lithium bis(fluorosulfonyl)imide (LiFSi), and combinations thereof. Preferably, lithium bis(trifluoromethanesulfonyl)imide is used in the solid-state electrolyte formulations.

The solid-state electrolytes disclosed herein can be assembled into an electrochemical cell (or solid-state battery) including two electrodes, an anode and a cathode. The solid-state batteries formed using the solid-state electrolyte formulations disclosed herein can be used with electrode configurations and materials known for use in solid-state batteries. The active material for use in the cathode can be any active material or materials useful in a lithium ion battery cathode, including the active materials in lithium metal oxides or layered oxides (e.g., $Li(NiMnCo)O_2$), lithium-rich layered oxide compounds, lithium metal oxide spinel materials (e.g., $LiMn_2O_4$, $LiNi_{0.5}Mn_{1.5}O_4$), olivines (e.g., $LiFePO_4$, etc.). Preferred cathode active materials include lithium cobalt oxide (e.g., $LiCoO_2$) and lithium metal layered oxides (e.g., $Li(Ni_xMn_yCo_z)_2$). Active materials can also include compounds such as silver vanadium oxide (SVO), metal fluorides (e.g., $CuF_2$, $FeF_3$), and carbon fluoride ($CF_x$). The finished cathode can include a binder material, such as poly(tetrafluoroethylene) (PTFE). More generally, the active materials for cathodes can include phosphates, fluorophosphates, fluorosulfates, silicates, spinels, and composite layered oxides. The materials for use in the anode can be any material or materials useful in a lithium ion battery anode, including lithium-based, silicon-based, and carbon-based anodes.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Unless otherwise specified, all materials were used as received and all examples were carried out a high-purity argon-filled glove box (M-Braun, $O_2$ and humidity content <0.1 ppm).

Inorganic Conductor Preparation.

LZP was synthesized by a two-step process of milling followed by thermal annealing. The desired stoichiometric ratios of precursor materials (such as oxides, hydroxides, carbonates, metals, and more specifically $Li_2CO_3$, $ZrO_2$, $(NH_4)_2HPO_4$) and one or more dopant materials were dispensed into a milling vessel under argon atmosphere. The dopant material can be an elemental dopant or a dopant precursor. The materials in the milling vessel were milled at the desired milling energy for about 6 hours. The resulting powder was then annealed at about 1000 degrees Celsius for about 72 hours under a nitrogen atmosphere.

Solid-State Electrolyte Preparation.

A polymer binder, such as poly(vinylidene difluoride) (PVdF), and a lithium salt, such as lithium bis(trifluoromethanesulfonyl)imide were dissolved in an organic solvent, such as N-methyl-2-pyrrolidone and mixed with the annealed material from the prior step. The mixture was stirred for at least 6 hours but typically overnight. The resulting slurry was cast on a stainless steel current collector to produce a film that was in the range of from about 61% to about 84% by weight doped LZP, about 9% by weight PVdF, and in the range of from about 7% to about 30% by weight LiTFSI. The resulting film was dried at about 150 degrees Celsius for several hours until ready for processing.

Test Cell Assembly and Cycling.

The solid-state electrolyte film was pressed at about 3 ton/cm² prior to building test cells. The testing cell architecture consisted of the solid-state electrolyte sandwiched between two stainless steel blocking electrodes. Typical solid-state electrolyte thickness was in the range of from about 15 microns to about 20 microns. Cells were tested by electrochemical impedance spectroscopy in the range of from 1 Hz to 1 MHz.

Results

FIG. 1 illustrates x-ray diffraction patterns identifying the nature of the crystalline phases in undoped LZP materials and LZP materials doped with various quantities of tin (Sn) as a dopant according to certain embodiments of the invention. The bottom diffraction pattern in FIG. 1 is undoped LZP, as indicated by the label "X=0," which refers to the subscript "x" in the formula for LZP doping: $LiZr_{2-x}Sn_x(PO_4)_3$. The undoped LZP exhibits a characteristic triclinic crystalline phase. The next three diffraction patterns demonstrate that the addition of tin as a dopant affects the crystalline phase of the LZP. The pattern second from the bottom and labeled "X=0.3" is of a material having the formula $LiZr_{1.7}Sn_{0.3}(PO_4)_3$. Certain new peaks appear in the x-ray diffraction pattern of this doped material, and the new peaks (as well as the change in some relative intensities in peaks) are consistent with the temperature-induced formation of a rhombohedral phase described by Arbi et al. Unexpectedly, this rhombohedral phase is stable at temperatures lower than the rhombohedral phase for undoped LZP. The pattern second from the top and labeled "X=0.5" is of a material having the formula $LiZr_{1.8}Sn_{0.5}(PO_4)_3$. This material exhibits similar new peaks and changes in some relative intensities in peaks to the other doped LZP material. Finally, the top pattern is labeled "X=1.0" and corresponds to a material having the formula $LiZr_{1.0}Sn_{1.0}(PO_4)_3$. While this doped LZP material is also similar to the other doped LZP materials in FIG. 1, it also contains evidence of phases of tin oxide ($SnO_2$), which are labeled with asterisks. The presence of a tin oxide phase is not preferred.

Figure 2:
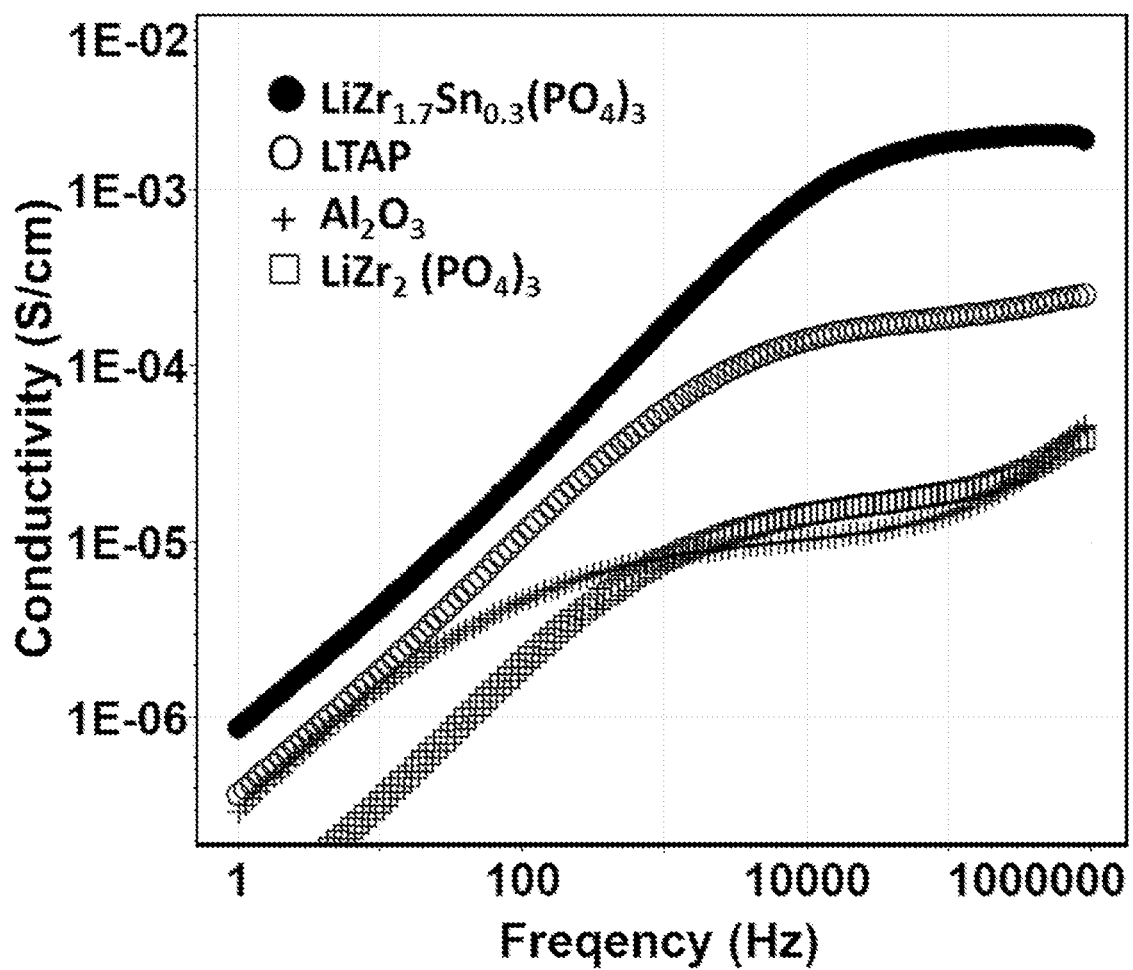
FIG. 2 illustrates electrochemical testing of a several comparative materials, including undoped LZP, aluminum oxide ($Al_2O_3$), and LTAP, and an LZP material doped with tin (Sn) according to certain embodiments of the invention.

FIG. 2 illustrates electrochemical testing of a several comparative materials, including undoped LZP, aluminum oxide ($Al_2O_3$), and LTAP, and an LZP material doped with tin (Sn) according to certain embodiments of the invention. Electrochemical impedance spectroscopy was performed on one of the materials shown in FIG. 1, $LiZr_{1.7}Sn_{0.3}(PO_4)_3$, as well as three other inorganic solid-state electrolyte materials for comparison. FIG. 2 demonstrates that the doped LZP outperforms all of the comparative materials, particularly at high frequency. In some cases, the conductivity of the doped LZP is two order of magnitude greater than that if the undoped LZP. This is an unexpected result and demonstrates the stable phase developed in the doped LZP material. These conductivity measurements were taken at room temperature and all other aspects of the solid-state electrolyte were the same, including the choice of polymer binder and the processing methods.

Figure 3:
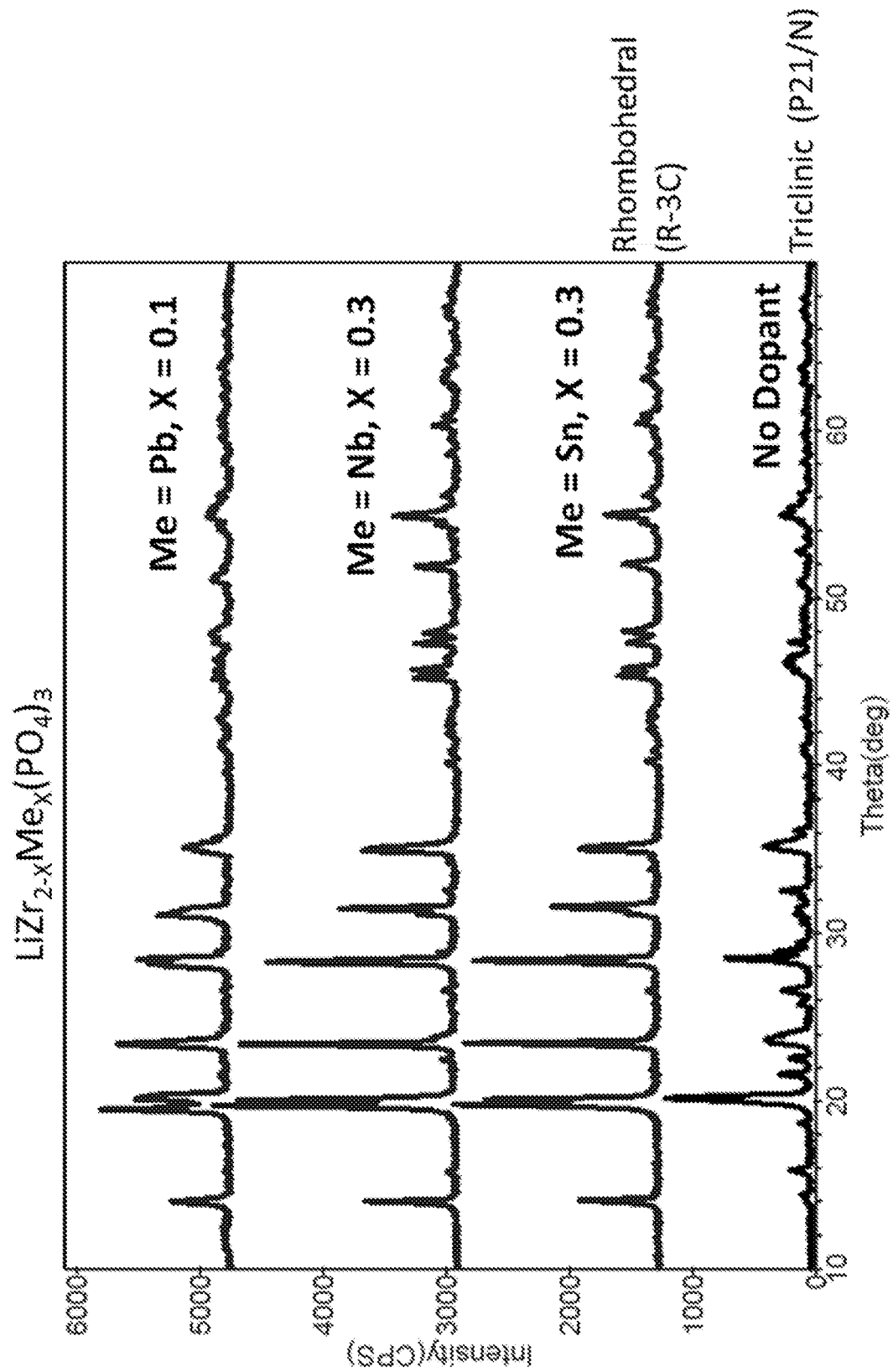
FIG. 3 illustrates x-ray diffraction patterns identifying the nature of the crystalline phases in undoped LZP materials and LZP materials doped with various quantities of dopants according to certain embodiments of the invention.

FIG. 3 illustrates x-ray diffraction patterns identifying the nature of the crystalline phases in undoped LZP materials and LZP materials doped with various quantities of dopants according to certain embodiments of the invention. As with FIG. 1, the bottom diffraction pattern is the undoped LZP material and it exhibits the characteristic triclinic phase. The pattern second from the bottom and labeled "X=0.3" is of a material having the formula $LiZr_{1.7}Sn_{0.3}(PO_4)_3$. The pattern is consistent with the temperature-induced formation of a rhombohedral phase described by Arbi et al. The pattern second from the top is from a material doped with niobium at the same "X=0.3" amount such that the material has the formula $LiZr_{1.7}Nb_{0.3}(PO_4)_3$. The top diffraction pattern is from a material where "X=0.3" and the material was lead (Pb) such that the material has the formula $LiZr_{1.9}Pb_{0.1}(PO_4)_3$. Both the lead and the niobium demonstrate that they are capable of stabilizing the rhombohedral phase of LZP at room temperature.

Figure 4:
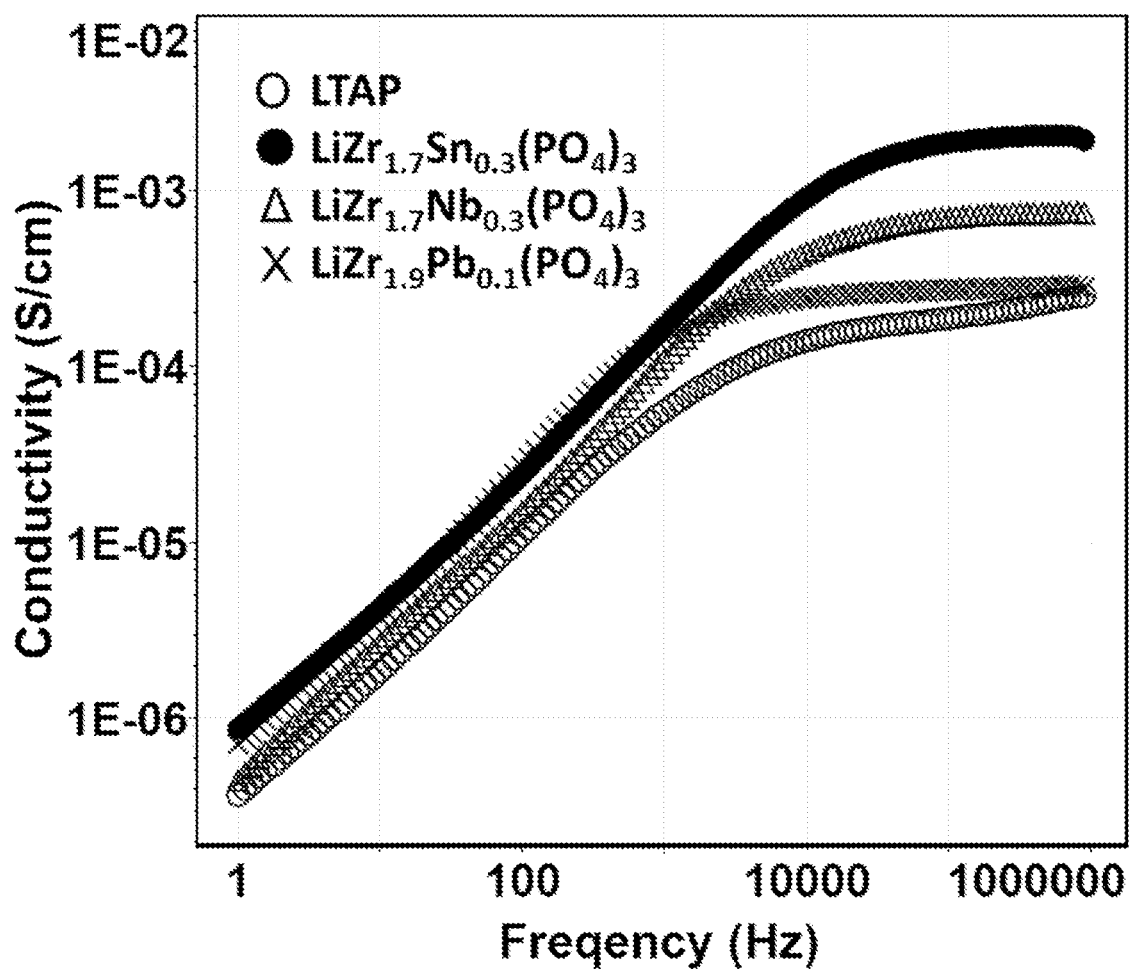
FIG. 4 illustrates electrochemical testing of LTAP compared to various doped LZP materials according to certain embodiments of the invention.

FIG. 4 illustrates electrochemical testing of LTAP compared to various doped LZP materials according to certain embodiments of the invention. The doped materials of FIG. 3 are compared to an undoped LTAP material. As with FIG. 2, these conductivity measurements were taken at room temperature and all other aspects of the solid-state electrolyte were the same, including the choice of polymer binder and the processing methods. Again, the tin-doped material performs the best among the tested materials. Lead-doped LZP and niobium-doped LZP show performance at least as good as the state-of-the-art LTAP material. However, the Lead-doped LZP and niobium-doped LZP do not have the same chemical-reduction problem that is known for the LTAP solid-state electrolyte material. Thus, all three of these doped materials, and others like them, are preferable to and improvement on the state-of-the-art LTAP material or undoped LZP.

Comparing the results disclosed herein to the prior art, these results show a stabilized rhombohedral phase at room temperature, where past doping with lanthanum did not. Other stabilized phases, such as those using calcium or yttrium do not demonstrate comparable conductivity results. The doping disclosed herein and the improvements generated thereby are unexpected in view of the prior research.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. A lithium ion battery, comprising:
a lithium-based anode;
a cathode comprising an active material; and
a solid-state electrolyte comprising a polymer binder and an ion-conducting inorganic material represented by the formula:

where $2>x>0$, $0.2>y>-0.2$, and Me is tin (Sn), niobium (Nb), or combinations thereof, and a concentration of the ion-conducting inorganic material is no less than 61% by weight and no greater than 84% by weight relative to a total weight of the solid-state electrolyte.

2. The lithium ion battery of claim 1, wherein Me is tin (Sn).

3. The lithium ion battery of claim 1, wherein Me is niobium (Nb).

4. The lithium ion battery of claim 1 wherein the polymer binder comprises PVdF.

5. The lithium ion battery of claim 1, wherein the solid-state electrolyte further comprises a lithium salt.

6. The lithium ion battery of claim 5, wherein the lithium salt is selected from the group consisting of lithium bis(trifluoromethanesulfonyl)imide ($CF_3SO_2NLiSO_2CF_3$), lithium tetrafluoroborate ($LiBF_4$), lithium hexafluoroarsenate ($LiAsF_6$), lithium bis(oxalato)borate ($LiB(C_2O_4)_2$), lithium chlorate ($LiClO_4$), lithium hexafluorophosphate ($LiPF_6$), lithium triflate ($LiCF_3SO_3$), lithium bis(fluorosulfonyl)imide (LiFSi), or combinations thereof.

7. The lithium ion battery of claim 5 wherein the lithium salt comprises lithium bis(trifluoromethanesulfonyl)imide ($CF_3SO_2NLiSO_2CF_3$).

8. The lithium ion battery of claim 1, wherein Me is the combination of niobium (Nb) and tin (Sn).

9. The lithium ion battery of claim 1, wherein the solid-state electrolyte lacks a solvent.

10. A lithium ion battery, comprising:
a lithium-based anode;
a cathode comprising an active material; and
a solid-state electrolyte comprising an ion-conducting inorganic material represented by the formula:

$$Li_{1+y}Zr_{2-x}Me_x(PO_4)_3$$

where $2>x>0$, $0.2>y>-0.2$, and Me is tin (Sn) or a combination of niobium (Nb) and tin (Sn), and wherein the solid-state electrolyte lacks a solvent.

11. The lithium ion battery of claim 10, wherein the solid-state electrolyte further comprises a polymer binder.

12. The lithium ion battery of claim 11, wherein the polymer binder comprises PVdF.

13. The lithium ion battery of claim 10, wherein the solid-state electrolyte further comprises a lithium salt.

14. The lithium ion battery of claim 13, wherein the lithium salt is selected from the group consisting of lithium bis(trifluoromethanesulfonyl)imide ($CF_3SO_2NLiSO_2CF_3$), lithium tetrafluoroborate ($LiBF_4$), lithium hexafluoroarsenate ($LiAsF_6$), lithium bis(oxalato)borate ($LiB(C_2O_4)_2$), lithium chlorate ($LiClO_4$), lithium hexafluorophosphate ($LiPF_6$), lithium triflate ($LiCF_3SO_3$), lithium bis(fluorosulfonyl)imide (LiFSi), or combinations thereof.

15. The lithium ion battery of claim 13, wherein the lithium salt comprises lithium bis(trifluoromethanesulfonyl)imide ($CF_3SO_2NLiSO_2CF_3$).

16. The lithium ion battery of claim 10, wherein Me is the combination of niobium (Nb) and tin (Sn).

17. The lithium ion battery of claim 10, wherein a concentration of the ion-conducting inorganic material is no less than 61% by weight and no greater than 84% by weight relative to a total weight of the solid-state electrolyte.

18. A lithium ion battery, comprising:
a lithium-based anode;
a cathode comprising an active material; and
a solid-state electrolyte comprising an ion-conducting inorganic material represented by the formula:

$$Li_{1+y}Zr_{2-x}Me_x(PO_4)_3$$

where $2>x>0$, $0.2>y>-0.2$, and Me is a combination of niobium (Nb) and tin (Sn).

* * * * *